(12) United States Patent
Tohmo et al.

(10) Patent No.: US 8,898,749 B2
(45) Date of Patent: Nov. 25, 2014

(54) METHOD AND SYSTEM FOR GENERATING ONE-TIME PASSWORDS

(75) Inventors: Jesper Tohmo, Värmdö (SE); Christer Roslund, Tyresö (SE)

(73) Assignee: Intel Corporation, Santa Clara, CA (US)

( * ) Notice: Subject to any disclaimer, the term of this patent is extended or adjusted under 35 U.S.C. 154(b) by 692 days.

(21) Appl. No.: 12/757,430

(22) Filed: Apr. 9, 2010

(65) Prior Publication Data

US 2010/0263029 A1 Oct. 14, 2010

Related U.S. Application Data

(60) Provisional application No. 61/168,001, filed on Apr. 9, 2009.

(51) Int. Cl.
*G06F 7/04* (2006.01)
*H04L 9/32* (2006.01)
*H04L 9/08* (2006.01)

(52) U.S. Cl.
CPC ........... *H04L 9/3228* (2013.01); *H04L 2209/80* (2013.01); *H04L 2209/56* (2013.01); *H04L 9/0863* (2013.01)
USPC ............................................. 726/5; 713/182

(58) Field of Classification Search
CPC .................................................. H04L 9/3228
USPC ................. 726/27, 28, 29; 713/182, 183, 184
See application file for complete search history.

(56) References Cited

U.S. PATENT DOCUMENTS

| 2006/0083228 | A1 | 4/2006 | Ong et al. | |
|---|---|---|---|---|
| 2007/0130463 | A1* | 6/2007 | Law et al. | 713/168 |
| 2007/0136799 | A1* | 6/2007 | Brennan | 726/9 |
| 2009/0158032 | A1* | 6/2009 | Costa et al. | 713/156 |

* cited by examiner

*Primary Examiner* — Christopher Brown
(74) *Attorney, Agent, or Firm* — Grossman, Tucker, Perreault & Pfleger, PLLC (57) ABSTRACT

A method for one-time password generation, the one-time password being used for user authentication by a restricted resource. The one-time password is generated by means of a mathematical algorithm in a user-specific device, and the one-time password is generated by the mathematical algorithm using at least one user-specific password generation parameter. A first password generation parameter is used for generating a first one-time password for use in user authentication by a first restricted resource, and a second password generation parameter is used for generating a second one-time password for use in user authentication by a second restricted resource, the second restricted resource being different from the first restricted resource, and the first and second password generation parameters being distinct.

16 Claims, 5 Drawing Sheets

METHOD AND SYSTEM FOR GENERATING ONE-TIME PASSWORDS

This application claims the benefit of U.S. Provisional Application No. 61/168,001, filed Apr. 9, 2009, the disclosure of which is incorporated by reference in its entirety.

FIELD OF THE INVENTION

The present invention relates to the field of one-time password generation and in particular to generation of one-time passwords in mobile devices, in particular, the present invention relates to a device and method for generating one-time passwords. The invention also relates to a system, a computer program, and a computer program product.

BACKGROUND OF THE INVENTION

The evolvement of the Internet has in many ways changed behaviours that have prevailed for a long time. Peer-to-peer communication and the ease by means of which exchange of information now can be performed have opened up for limitless ways of utilizing the Internet for everyday use.

Internet banking, electronic commerce and e-mail constitute but a few examples of the possibilities that the electronic world offer, thus omitting the need for a user to actually visit a bank, stores for purchasing goods, etc.

Unfortunately, however, the possibilities of doing business over the Internet, instead of physically visiting various physical locations, has also given rise to its own set of challenges and security issues, primarily in the areas of user authentication and secure data transfer.

A general Internet user is often registered to (member of) a plurality of different Internet sites, and when the user identifies himself/herself with such sites, this is often performed by entering a login name and a corresponding password. Every now and then, however, Internet sites are "hacked", with the possible result that login (user) names and associated passwords of users (members) of the site come into the hands of unauthorized and, at worst, criminal persons.

If login information, such as user names and passwords, come into the hands of the wrong persons, users of a hacked site can suffer substantial damage, e.g. by finding themselves with cleared out bank accounts. Further, it is common that a member of one Internet site "reuses" login name and password from one site to another, with the further risk of suffering unauthorized access not only to the site being hacked, but at other sites as well. There is also an inherent risk that a potential intruder, given enough time and attempts, can obtain login information simply by "trial-and-error".

Further, there is also an increasing desire from governments to be able to electronically communicate with citizens in a safe and secure manner with regard to various social services, and such social services often involve large amounts of personal and confidential data, with associated strict requirements on the ability to ascertain the identity of a particular user. Simpler authentication methods, such as user name and password, are simply not strong enough but must be strengthened.

Due to the above, it is becoming more and more common to strengthen the protection against unauthorized access by the use of one-time passwords in addition to the conventional (static) passwords. One-time passwords are constantly and inherently altered, which thus substantially reduces the risk of the passwords falling into the wrong hands. One-time passwords thus make it more difficult to gain unauthorized access to user accounts.

Consequently, there exist ways of strengthening security when accessing restricted resources. A drawback, however, in utilizing such stronger authentication methods is that one-time passwords often require, from the user point of view, some kind of hardware device, such as a digipass or code card or other means, for generating the one-time passwords, with the result that a user often ends up with various different methods of accessing the different restricted resources to which he or she belongs. Therefore, there exists a need for a simplified method of accessing restricted resources.

SUMMARY OF THE INVENTION

It is an object of the present invention to provide a method and device for generating one-time passwords that at least mitigates the above mentioned problems.

According to the present invention, it is provided a method for one-time password generation, the one-time password being used for user authentication by a restricted resource, wherein the one-time password is generated by means of a mathematical algorithm in a user-specific device, and wherein the one-time password is generated by the mathematical algorithm using at least one user-specific password generation parameter. A first password generation parameter is used for generating a first one-time password for use in user authentication by a first restricted resource, and a second password generation parameter is used for generating a second one-time password for use in user authentication by a second restricted resource, wherein the second restricted resource is different from the first restricted resource, and wherein the first and second password generation parameters are distinct.

This has the advantage that a method is provided wherein a user can access a plurality of restricted resources by means of a single hardware device, however without any interaction between any of the restricted resources. The use of different password generation parameters for different restricted resources ensure that the hardware device cannot be utilized to gain unauthorized access to any restricted resource other than the ones to which the user does belong.

The first and second password generation parameters can, for example, constitute different encryption keys such as symmetric keys. In one embodiment a one-time password is generated using not only one password generation parameter, but using at least two password generation parameters, such as, e.g. an encryption key and a counter. Counters for different restricted resources can also be arranged to be distinct. The counters are preferably incremented for each generation of a one-time password, wherein one increment can be, e.g., 1, −1 or any suitable number.

Other kinds of parameter combinations can also be used. For example, instead of using a counter, e.g., a parameter that is dependent on the formerly generated one-time password can be used together with the first password generation parameter.

Further characteristics of the present invention, and advantages thereof, will be evident from the following detailed description of preferred embodiments and appended drawings, which are given by way of example only, and are not to be construed as limiting in any way.

DETAILED DESCRIPTION OF EXEMPLARY EMBODIMENTS

In the present description and the appended claims, the term "restricted resource" is used to represent any kind Internet site that require user identification, e.g. by means of user name and associated password. Examples of such restricted resources include online banking services, e-mail service providers, e-commerce stores, user forums, government web site services etc. Further, the term "restricted resource" as used herein also includes non-Internet resources, such as, e.g., telephone services (e.g. government or bank telephone services) requiring user identification, and also services provided by computer networks other than the Internet.

As was mentioned above, the possibilities of doing business over the Internet, such as, e.g., online banking, purchasing and selling goods, etc. has had as result that users increasingly tend to electronically access restricted resources, such as Online Banking Service, e-commerce stores, government web site services etc.

When a user request access to such restricted resources, the user, in general, enters a user name and associated password, which password is often kept unchanged for longer periods of time. However, since such "static" passwords suffers the risk of being gained access to by an unauthorized person, e.g. by "hacking" or other fraudulent conduct, security, at least with regard to restricted sites that contain sensitive and/or confidential user data, such as Internet banks, is often strengthened by the use of one-time passwords.

There are various methods of generating one-time passwords. For example, a mathematical algorithm stored in a hardware device can be used to generate one-time passwords, where, following generation of a first one-time password, the next one-time password is at least partially dependent on the formerly generated password, or where consecutive passwords are generated by incrementing a counter prior to or following each password generation. The generated passwords can be verified by the restricted resource by performing the same calculations using the same algorithm and, if used, counter.

Another kind of one-time passwords utilizes time-synchronisation, that is, the restricted resource and the hardware device generating a password must be time-synchronised, i.e. the password is time dependent. A further kind of one-time passwords is use of a list of (randomly) generated passwords which is handed to the user, the passwords then being used one after another in consecutive access requests.

Consequently, there exists a plurality of methods for generating one-time passwords. This, however, has the inherent result that users being registered to multiple restricted resources often utilize plural different methods to enter these sites.

Further, although different restricted resources may utilize the same general method for the generation of one-time passwords (OTPs) the devices that are used for generating these OTPs are incompatible with each other, that is, a user being registered at plural restricted resources in general is required to keep track of and carry around separate hardware devices for each restricted resource. This is not only cumbersome to the user but also inefficient from a cost perspective point of view.

The present invention, however, provides a method and device that provides for secure authentication to a plurality of restricted resources using a single hardware device, such as e.g. a mobile device such as mobile phone, smartphone, Personal Digital Assistant, handheld computer etc. Thereby cumbersome use of plural hardware devices can be mitigated to a substantial extent. If the single remaining hardware device constitutes an integrated part of a mobile phone, or a software application in a mobile phone, the user, in principle, need not carry any further hardware devices than the ones he/she carries around anyway.

Figure 1:
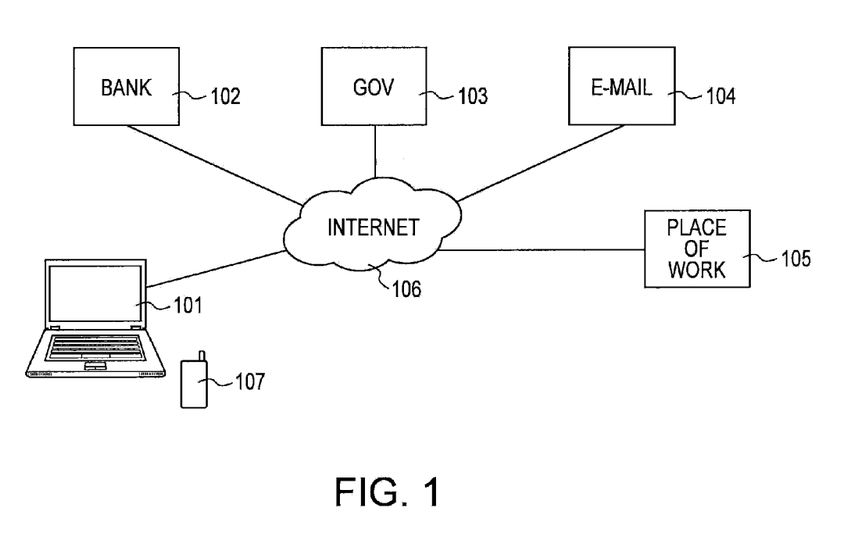
FIG. 1 schematically shows a system in which the present invention advantageously can be utilized.
Figure 2:
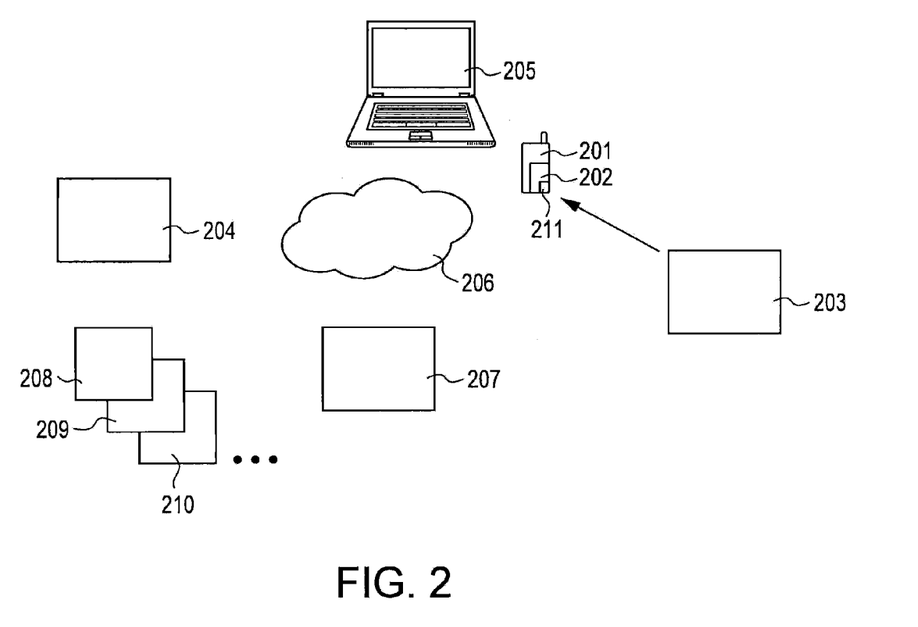
FIG. 2 shows an exemplary embodiment of the present invention.

A first exemplary embodiment of the present invention will be described with reference to FIGS. 1-3. In FIG. 1 is shown a user computer 101, such as a laptop or desk top computer, which is used by a user to electronically access various restricted resources, e.g. using the Internet. By means of the computer 101 the user interacts with the restricted resources he/she is registered to, e.g. an online banking service 102, an e-commerce store 103, and an e-mail service 104. The computer 101, is also utilized to telecommute, e.g. using VPN software, to the user's place of work 105. As was mentioned above, in general, restricted resources of this kind utilize, or have an increasing tendency to utilize, stronger authentication than a mere use of user name and associated password.

As was also mentioned above, the present invention provides stronger authentication using a system wherein a single hardware device is used. However, a system wherein all restricted resources, e.g. restricted resources 102-105, utilize a joint security system to reduce the number of user hardware devices, may not, e.g. for security reasons, be acceptable to the restricted resources. For example, this may require that the various restricted resources must be interconnected, which can be difficult to accomplish. Further, such systems can be vulnerable, for example, if a user being registered to plural restricted resources loses his/her hardware device, not only restricted resources to which the user belongs are exposed, but also other restricted resources of the system.

The present invention, therefore, provides a system in which, while still reducing the number of hardware devices to a single hardware device for restricted resources of the system, the communication between user and a particular restricted resource is independent of the communication between the user and any other restricted resource, and in which registration to one restricted resource does not increase the risk of unauthorized access to other restricted resources of the system.

Consequently, the present invention provides a system wherein a user of computer 101 can access each of the various restricted resources 102-105 by means of a single hardware device 107, however without any interaction between any of the restricted resources 102-105. The present invention is made possible by a general OTP generation application that is common for each of the restricted resources but which is only a dummy until it is provided with restricted resource "profiles" for the restricted resources to which the user is registered. These profiles contain OTP generation parameters that are different (distinct) for each restricted resource, thereby ensuring that the hardware device 107 cannot be utilized to gain unauthorized access to any restricted resource other than the ones to which the user does belong.

This will be explained more in detail with reference to FIGS. 2-3.

In the following exemplary embodiment a user's mobile phone is used as hardware device according to the present invention. The user's mobile phone 201 is first provided with the OTP generation application, which in principle consists of a software application 202 that preferably is downloadable. The OTP generation application includes an algorithm by means of which OTPs can be generated, and which is capable of receiving OTP generation parameters (restricted resource profiles) according to what will be described below. The user can, for example, download the OTP generation application, e.g., from a web site or an application store like Apple Inc. App Store or Google Inc. Android Market. The download and installation of the OTP generation application is preferably an automated process like many other applications are today, and dependent on the particular device being used. If, for example an Apple Inc. iPhone or iPod is used, the application can be downloaded and installed from the App Store. If a Java MicroEdition (JME)-enabled device is used the application can, for example be downloaded and installed by entering a URL in the web browser application in the user device instead. It is also contemplated that the application can be installed in the device during the manufacturing process, or constitute an integral part of the mobile phone.

When the device 201 has been provided with the OTP generation application 202, the device 201 is ready for use according to the present invention. A user that, e.g., requests to become customer of online banking service 204, which utilizes OTP protection according to the present invention, must first get his/her device 201 "set up" for use with the online banking service 204. The request for becoming a customer of the online banking service 204 can, for example, be communicated via the user's computer 205 or by means of visiting a conventional bank office or via a telephone service.

Figure 3:
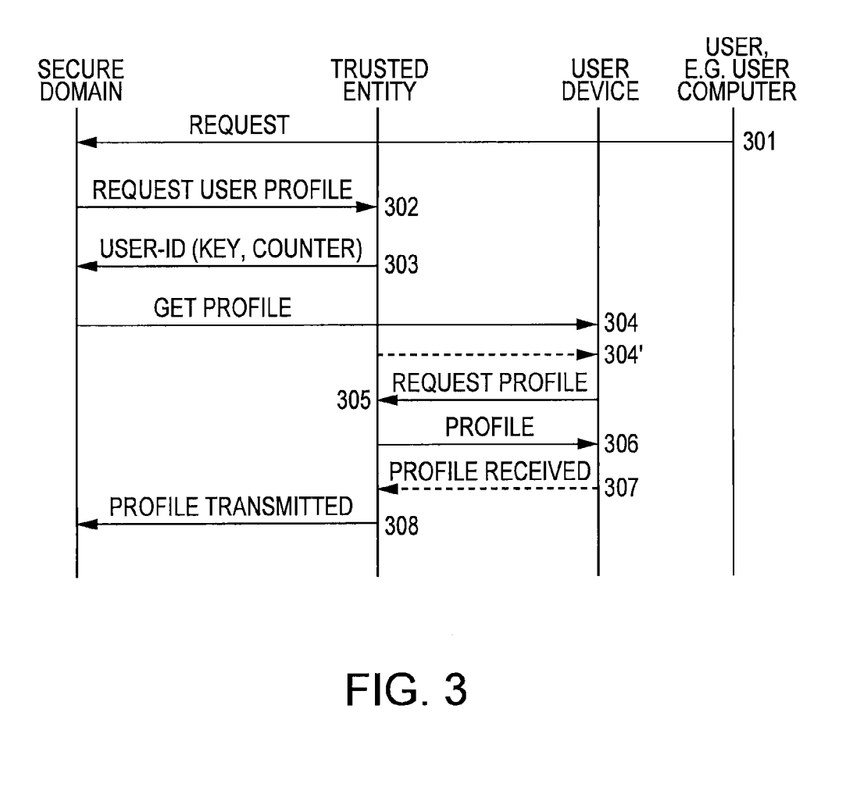
FIG. 3 shows an exemplary procedure for setting up a user device according to the present invention.

A non-limiting exemplary procedure for setting up a user device is disclosed in FIG. 3. The method starts with a request 301 according to the above. When the restricted resource (online banking service 204) has received the request, the online banking service 204, preferably following a validity check of the request (i.e. a verification of the user actually being the user he/she claims to be, which can be accomplished in any suitable manner) requests generation of an online banking service 204 user profile from a trusted entity 207, step 302.

The trusted entity 207 can, for example, constitute an entity that supplies user profiles for a plurality, or all restricted resources that utilizes a system according to the present invention. Alternatively, plural trusted entities can be used, or as a further alternative the trusted entity can constitute part of the restricted resource itself. It can, however, be advantageous and convenient for the restricted resources to utilize an external trusted entity as in the disclosed example. When the trusted entity 207 receives a user profile request 302, a user profile is generated following the request. As was mentioned, the OTP generation application can, in principle, be seen as an empty shell that includes an algorithm by means of which generation of OTPs are possible if proper password generation parameters are supplied. The algorithm can, for example, consist of the HOTP algorithm (also known as OATH). The OATH algorithm is a standardized open source algorithm. This algorithm generates one-time passwords from a secret shared encryption key and a counter. Naturally, other kinds of algorithms can be used as well, i.e. the RSA algorithm. The user profile request 302 from the restricted resource 204 includes a user ID and, optionally, a mobile phone number (use of the mobile phone number will be described below).

When the trusted entity 207 generates the user profile, this consists of generating a unique symmetric key and a corresponding counter. The unique symmetric key will, once the profile has been stored in the user device, be used to generate one-time passwords that can be verified by the restricted resource. Apart from generating this unique symmetric key and counter, the trusted entity can optionally "personalize" the profile by means of logotypes, icons, backgrounds etc. of the restricted resource so that the profile will be easily distinguishable once plural profiles have been stored in the user device 201. The trusted entity 207 further generates a unique profile name (e.g. a number or alphanumeric character sequence), which constitutes the identity of the profile, and which is used for subsequent download to the user device 201.

The unique symmetric key, corresponding counter, profile name and optional images etc. are then packed in a suitable manner, e.g. into an XML message, whereupon the trusted entity 207 replies back to the restricted resource with the unique symmetric key, corresponding counter and the user ID and optionally the unique profile name, step 303.

The restricted resource then prompts the user, e.g. via a text message, to get the profile, 304. The prompt for getting a profile also includes the unique profile name. Alternatively, if the user mobile phone number was included with the user profile request, the prompt for getting a profile can be transmitted directly to the user device 201 from the trusted entity 207 instead, 304'.

Once prompted to get the profile, the user starts the OTP generation application and selects, e.g., option "get profile" and enters the profile name. When the trusted entity 207 receives the profile request, 305, the profile 211 associated with the profile name (i.e. key, counter, images, etc.) is sent to the user device 201, e.g. as an XML message, step 306. The user device 201 can optionally acknowledge receipt of the profile, step 307, and the restricted resource is then informed of the transmission (transmission/reception) of the profile, step 308. When the profile 211 is received by the user device, it is installed into the OTP generation application 202 for subsequent use when generating OTPs. Once transmitted to the user device 201, the generated profile 211 can be deleted from the trusted entity (the unique profile name can be stored so as to ensure that no two profiles having the same name will be generated to avoid possible ambiguities at restricted resources and/or OTP generation applications. Once the profile 211 has been stored in the application 202 it is ready to be used. The steps of FIG. 3 can then be repeated each time the user starts using services of a new restricted resource (e.g. restricted resources 208, 209, 210 . . . ) supporting the system. Since the restricted resource has access to the same key and counter as the user, the restricted resource can verify a OTP that has been generated by the user device by performing the same calculation using the same algorithm, key and counter. As was mentioned above, other kinds of parameters than counters can also be used.

The profile can optionally require use of a PIN code, i.e. upon download of the profile, the user can be prompted to enter a PIN code, which then must be entered each time the particular profile is used to generate a OTP. Use of PIN code can also be selectable by the user, or be a mandatory requirement by the restricted resource. The PIN codes can also be required to be different for different restricted resources and this can, for example, be ascertained by the trusted entity or the OTP generation application. If a PIN code is selected, the symmetric key and counter is the encrypted with the PIN code, e.g. using AES-256 bit encryption or any other suitable encryption method.

Consequently, the user device is provided with a unique symmetric key-counter combination (preferably the symmetric key is unique by itself) for each restricted resource that the user registers with, which thus means that once the user and restricted resource have been provided with the key and counter, secure authentication can be obtained without any interaction between restricted resources. The present invention thus provides for a system that mitigates disadvantages of having plural hardware devices, while at the same time ensuring independency between different restricted resources.

Figure 4:
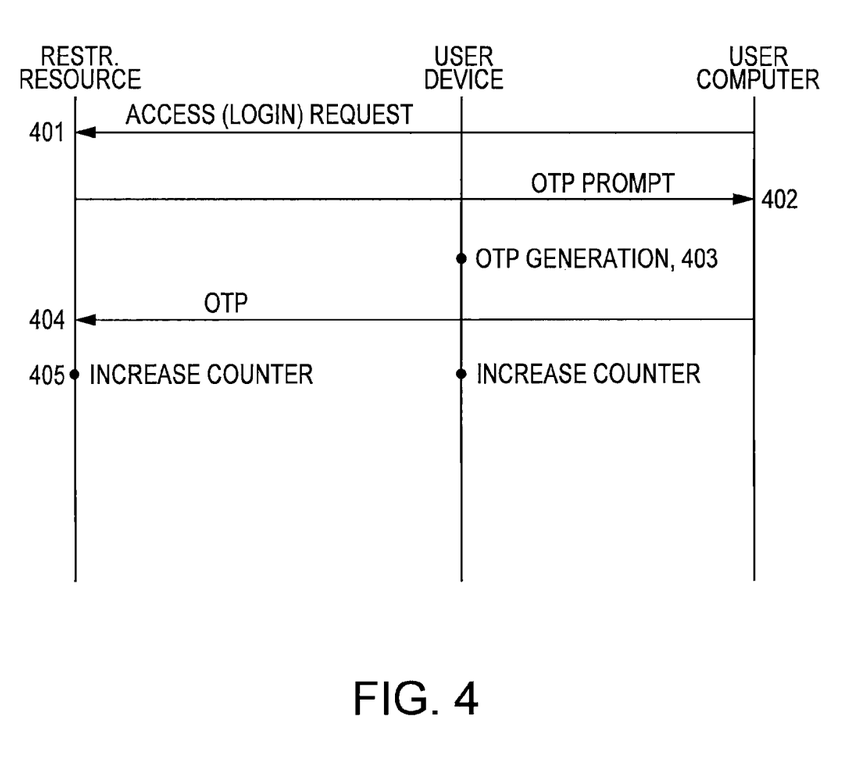
FIG. 4 shows an example of offline authentication according to the present invention.

Use of the present invention will now be described in connection with two different scenarios, the first being conventional "offline authentication", see FIG. 4. When the user requests access to the restricted resource 204, e.g. by means of the user computer 205, step 401, the user enters user name and (static) password, whereupon the user will be prompted to enter a one-time password. The user then starts the application 202 in the device 201 and selects the appropriate profile 211 (which is recognizable, e.g. by logotype, icon, name etc.). If the profile requires a PIN code, the user enters the PIN code which decrypts the symmetric key and the counter so as to allow OTP generation.

The key and counter are then used to generate a one-time password, 403, by means of the algorithm in the application 202 which then is presented to the user for entering into the restricted resource log-in procedure (via user computer), 404. Following the OTP generation, the application increases the counter by a predetermined value, e.g. 1, and the corresponding counter at the restricted resource is increased by the same value, 405. Since the restricted resource will always have knowledge of symmetric key and counter, the key and counter are used to verify the OTP by applying key and counter on the same algorithm.

Consequently, it is not only required that the correct key is used to generate the OTP, but also that the counters correspond to each other (it is possible to allow a certain difference in counter values, e.g. one or two or three or an appropriate number of counts so that log-in can be successfully accomplished even if the counters are not perfectly synchronized. In such situations, the restricted resource tests all counters within the allowed interval to see if any of the such generated passwords are correct.)

Figure 5:
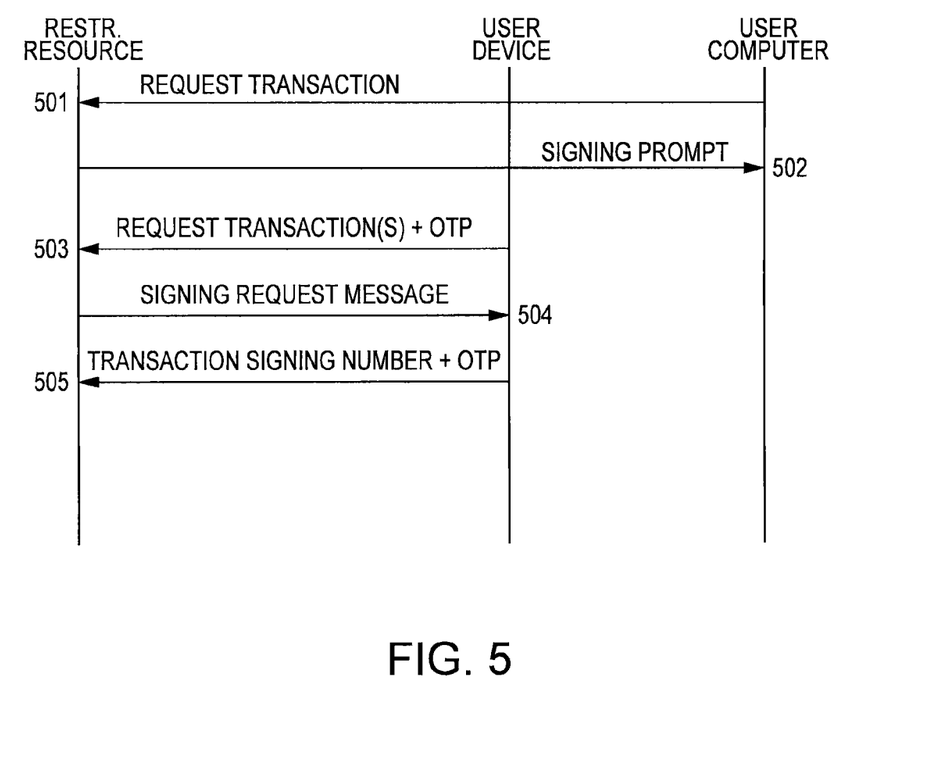
FIG. 5 shows an example of on-line signing according to the present invention

The present invention also provides a method for on-line signing, see FIG. 5. When a restricted resource service, such as a user requesting a bank account transaction, 501, requires the transaction to be signed or verified, the transaction can be temporarily stored in a data base in the restricted resource. Immediately following the transaction request, or after a user has requested a number of transactions, the restricted resource can prompt the user to use the device 201 to sign the transactions, 502. The user then starts the application 202 and selects appropriate profile according to the above. The user then selects, e.g., "signing", and enters, if so required, the PIN code. An OTP is then generated and, together with user ID, the device uses an on-line URL (Uniform Resource Locator) stored in the profile to connect to the restricted resource and ask for transactions to be signed, 503, and the application increases the counter by one step. The URL can be specified by the restricted resource and, e.g., be transmitted to the trusted entity in step 302 to be included in the profile that subsequently is downloaded by the user device. The on-line URL can then be used by the end user to download "confirmation requests" from the restricted resource. The requests are then presented to the end user as questions or information, and can be answered to by selecting a button and by entering information into one or more data fields in the OTP generation application.

The restricted resource first verifies that the OTP is correct for the specific end-user and then creates a message, e.g. an XML message comprising all outstanding requests. The message also includes a unique transaction number. The corresponding counter for the particular user at the restricted resource is also increased by one step. The message is sent to the user device, 504, which present the signing requests to the user and prompt for a reply.

Depending on the format of the message, the user can reply, e.g. by selecting a button or entering a value into a text field. A new OTP is generated with corresponding increase of counter by one step. A reply message is then generated which will be sent back to the restricted resource and which includes the transaction (signing) number and the generated OTP, 505. Similar to the above, if the profile requires a PIN code, the user must first enter the PIN code before signing can take place. When the reply has been sent back to the restricted resource, the signing request is removed from the user device.

The restricted resource receives the reply, verifies the OTP and executes the transactions if the OTP is valid. If not, the transactions will not be executed and the user is notified thereof. Finally, the restricted resource user counter is increased by one step.

In sum, the present invention thus provides for a novel method of generating OTPs for a plurality of restricted resources, which substantially reduces the burden of a user to keep track of multiple hardware devices, while at the same time providing a system to which restricted resources easily can be added without affecting already existing restricted resources of the system.

Further, although the present invention has been described with reference to Internet sites above, it is to be understood that it can be utilized in any kind of system wherein strong user authentication is required. Also, hitherto the hardware device has been described as a mobile phone. The hardware device can, however, be of any kind that is capable of receiving profiles according to the present invention.

What is claimed is:

1. Method for one-time password generation, the one-time password being used for user authentication by a restricted resource, wherein the one-time password is generated by means of a mathematical algorithm in a user-specific device, and wherein the one-time password is generated by the mathematical algorithm using at least one user-specific password generation parameter, comprising using the device to perform the steps of:

transmitting a request to a restricted resource, said request configured to cause said restricted resource to instigate the generation of said at least one user specific password generation parameter by a trusted entity;

receiving, in response to said request to the restricted resource, the at least one user-specific password generation parameter together with an identity of the associated restricted resource to which the password generation parameter makes authentication possible;

using a first password generation parameter of said at least one password generation parameter to generate a first one-time password for use in user authentication by a first restricted resource, and using a second password generation parameter of said at least one password generation parameter to generate a second one-time password for use in user authentication by a second restricted resource, wherein the second restricted resource is different from the first restricted resource, and wherein the first and second password generation parameters are distinct.

2. Method according to claim 1, wherein the first one-time password is generated by means of the first and a third password generation parameter, and wherein the second one-time password is generated by means of the second and a fourth password generation parameter.

3. Method according to claim 2, wherein the first and second password generation parameters consist of distinct encryption keys, and wherein the third and fourth password generation parameters consist of a first and second counter, respectively.

4. Method according to claim 2,
wherein, when a user requests access to the first restricted resource, a one-time password is generated by means of the first and third password generation parameters, and
wherein, when a user requests access to the second restricted resource, a one-time password is generated by means of the second and fourth password generation parameters.

5. Method according to claim 3, wherein the counters are incremented in the device and at the restricted resource each time a one-time password is generated.

6. Method according to claim 1, wherein the password generation parameters are transmitted to the device from the associated restricted resource or from said trusted entity.

7. Method according to claim 6, wherein the trusted entity is a trusted entity that transmits password generation parameters for a plurality of restricted resources.

8. Method according to claim 1, wherein, prior to the generation of a one-time password, the user is required to enter a PIN code associated with the password generation parameter(s) by means of which the one-time password is to be generated.

9. Method according to claim 1, further comprising the steps of, when a restricted resource service requires one or more user actions to be signed and/or verified,
prompting the user to use the device to sign and/or verify the action,
by means of the device, in a signing mode, generating a one-time password and connecting to the restricted resource to request action(s) to be signed and/or verified using the generated one-time password and a user ID,
by means of the restricted resource, verifying the one-time password and transmitting a message comprising action signing requests to the user device, and
by means of the device, generating a new one-time password and generating a reply message for transmission to the restricted resource, the message including an identity of the action to be signed and the generated one-time password.

10. Method according to claim 1, wherein the device is a mobile device consisting of any from the group: mobile phone, smartphone, Personal Digital Assistant, handheld computer.

11. Method according to claim 3, wherein the encryption keys are symmetric keys.

12. Device for one-time password generation, the one-time password being used for user authentication by a restricted resource, wherein the device is provided with a mathematical algorithm for generating one-time passwords, and wherein a one-time password is generated by the mathematical algorithm using at least one user-specific password generation parameter, wherein the device further is arranged to:
transmit a request to a restricted resource, said request configured to cause said restricted resource to instigate the generation of said at least one user specific password generation parameter by a trusted entity;
receive, in response to said request to the restricted resource, the at least one user-specific password generation parameter together with an identity of the associated restricted resource to which the password generation parameter makes authentication possible;
use a first password generation parameter of said at least one password generation parameter to generate a one-time password for use in user authentication at a first restricted resource, and
use a second password generation parameter of said at least one password generation parameter to generate a one-time password for use in user authentication at a second restricted resource, wherein the second restricted resource is different from the first restricted resource, and wherein the first and second password generation parameters are distinct.

13. Device according to claim 12, further comprising means for,
prior to the first generation of a one-time password for use in user authentication at a restricted resource, receiving password generation parameter(s) associated with the restricted resource.

14. System for one-time password generation, the one-time password being used for user authentication by a restricted resource, wherein the one-time password is generated by means of a mathematical algorithm in a user-specific device, and wherein the one-time password is generated by the mathematical algorithm using at least one user-specific password generation parameter, wherein the system comprises:
a first trusted entity configured to, in response to a first request from a first restricted resource, generate a first password generation parameter and transmit said first password generation parameter to the user-specific device, the first password generation parameter configured for use by said user-specific device for the generation of one-time passwords to be used in user authentication at the first restricted resource, and
a second trusted entity configured to, in response to a second request from a second restricted resource, generate a second password generation parameter and transmit said second password generation parameter to the user-specific device, the second password generation parameter configured for use by said user-specific device for the generation of one-time passwords to be used in user authentication by the second restricted resource,
wherein:
the second restricted resource is different from the first restricted resource;
the first and second password generation parameters are distinct; and
said first request is transmitted by said first restricted resource in response to a first access request received from the user specific device; and
said second request is transmitted by said second restricted resource in response to a second access request received from said user specific device.

15. System according to claim 14, wherein the first and second trusted entities are the same trusted entity, wherein the same trusted entity is common to a plurality of restricted resources.

16. A non-transitory, tangible computer readable medium including a computer program with, code means which, when run by a processor in a device, causes the device to execute the method according to claim 1.

* * * * *